United States Patent Office 3,544,274
Patented Dec. 1, 1970

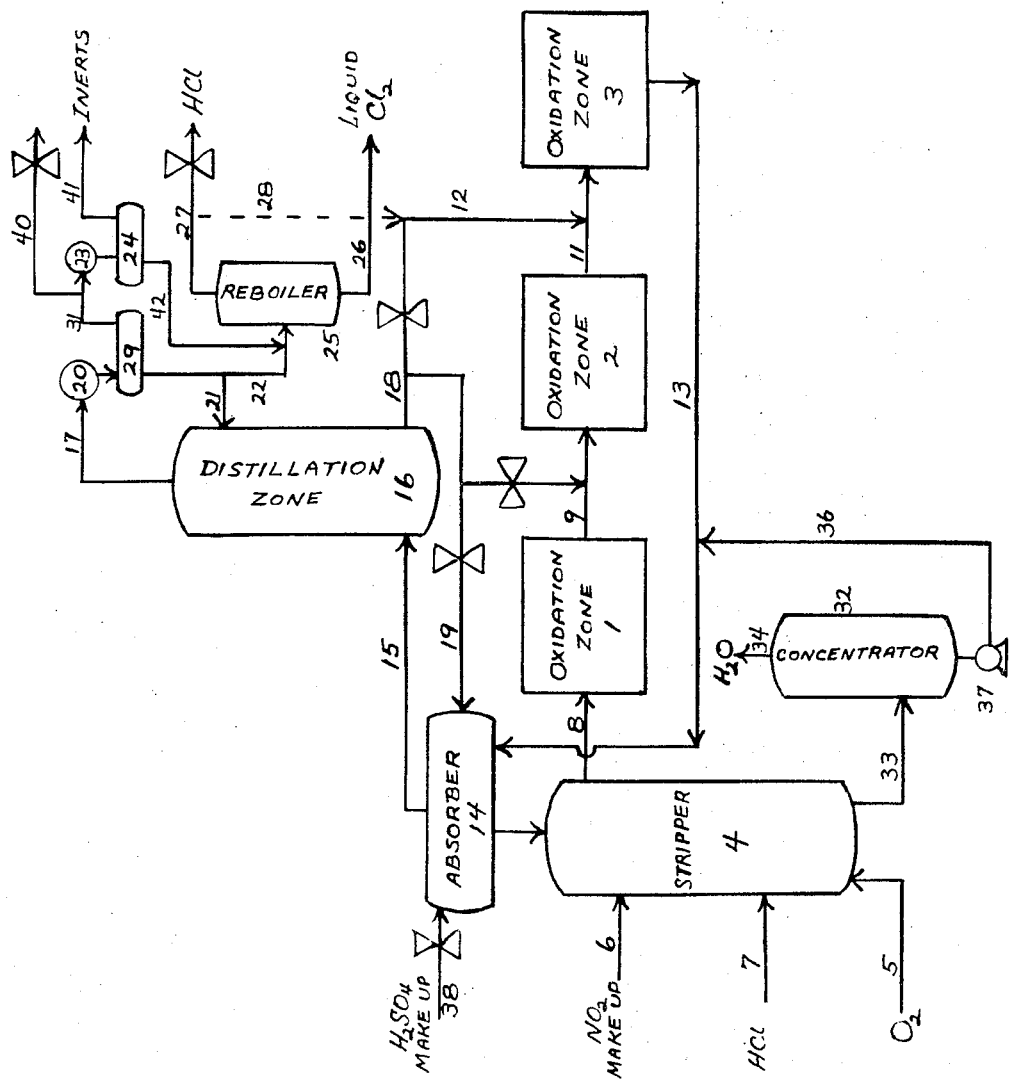

3,544,274
HALOGEN PRODUCTION
Christiaan P. van Dijk, Westfield, and Frank H. Siebentritt, Lebanon, N.J., assignors to Pullman Incorporated, Chicago, Ill., a corporation of Delaware
Filed Dec. 3, 1968, Ser. No. 780,682
Int. Cl. C01b 7/04
U.S. Cl. 23—219                                                  20 Claims

ABSTRACT OF THE DISCLOSURE

In a process where hydrogen halide is oxidized with oxygen in the presence of an oxygen-containing compound of nitrogen as a catalyst, the gaseous oxidizer effluent is passed to a sulfuric acid absorption zone, to dry said effluent and the gaseous effluent from the absorption zone is introduced into a distillation zone wherein halogen is separated in a gaseous overhead mixture from a liquid effluent containing a nitrogen oxide halide and halogen, the improvement wherein the liquid effluent is passed as a coolant to the oxidizer and/or the absorber to control the exothermic heat of reaction, to convert the nitrogen oxide halide to halogen and to utilize the exothermic heat of reaction to provide reboiling in the distillation zone. A further aspect of the invention comprises operating the oxidation zone in a plurality of stages with intermittent cooling by means of the liquid effluent or another suitable coolant at temperatures which decrease in each successive stage of the oxidation zone.

---

This invention relates to a process for the production of halogen. More specifically, this process relates to the oxidation of an inorganic halide in the presence of an inorganic nitrogen compound containing oxygen to produce halogen in a high state of purity. In one aspect, this invention relates to the elimination of oxygen- and chlorine-containing nitrogen compound impurities in the purification of chlorine. In still another aspect, this invention relates to an improved, multi-stage oxidation of hydrogen halide.

Many processes for the production of halogen have been proposed which involve the oxidation of a hydrogen halide in the presence of an oxygen-containing nitrogen compound. However, the yield of halogen in these processes has been limited to the equilibria of the reversible reactions at the high temperatures which are developed by the exothermic reaction. Processes of high commercial value in the production of halogen, especially chlorine, are the oxidation of a hydrogen halide, particularly hydrogen chloride, which involves one or more of the following reversible reactions:

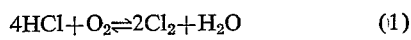
$$4HCl + O_2 \rightleftharpoons 2Cl_2 + H_2O \tag{1}$$
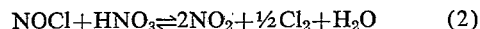
$$NOCl + HNO_3 \rightleftharpoons 2NO_2 + \tfrac{1}{2}Cl_2 + H_2O \tag{2}$$
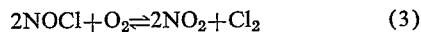
$$2NOCl + O_2 \rightleftharpoons 2NO_2 + Cl_2 \tag{3}$$

The equilibrium of the above reactions is favorable to the production of chlorine when the temperature is maintained within a certain range. Heretofore processes have controlled temperature by employing a high circulation rate or by supplying indirect heat exchange in the reactor. However, heat exchange equipment is subject to corrosion, since the by-product of the oxidation is water and wet hydrogen halide is therefore necessarily present in the reaction zone. A high circulation rate is also objectionable, since it is accompanied by low conversion and necessitates oversizing of the contacting equipment.

Another disadvantage of existent hydrogen halide oxidation processes is the difficulty in removing nitrogen oxides and nitrogen oxide halides from the halogen product. For example, nitroxyl chloride ($NO_2Cl$) is among the impurities which resist absorption by sulfuric acid, thus necessitating distillation with requirements of reboil at necessarily higher temperatures than the condensation temperature of halogen. Therefore, the conditions of operation are highly corrosive because of trace amounts of water which cannot be removed by normal treatment of the feed to the distillation zone. Moreover, complete removal of nitrogen oxide halide impurities from the halogen product leads to major disadvantages in the economy of the process.

Therefore, it is an object of the present invention to provide a process for the production of halogen wherein these disadvantages are reduced or entirely eliminated.

Another advantage is to provide an improved method for the oxidation of a hydrogen halide in the presence of an inorganic oxygen-containing nitrogen compound.

Another object of this invention is to provide a commercial and economically feasible process for the production of chlorine or bromine from an inorganic chloride or bromide.

Another object is to provide a self-regenerating process for continuously producing halogen product in a high state of purity.

Another object is to provide a method for substantially complete conversion of hydrogen chloride to chlorine product substantially free of nitrogen-containing compounds.

Still another object of this invention is to completely remove nitroxyl chloride and other nitrogen compounds from the chlorine product of the process.

Still another object of the invention is to provide a hydrogen halide oxidation process having improved heat economy accompanied by the elimination of certain internal reboilers and heat exchange equipment.

These and other objects of the present invention will become apparent to those skilled in the art from the accompanying description and disclosure.

According to the present invention, the hydrogen halide is oxidized with oxygen in the presence of an inorganic oxygen-containing compound of nitrogen as a catalyst and the gaseous oxidation effluent containing halogen product and a nitrogen oxide halide as an impurity is treated with sulfuric acid in an absorption zone and is passed to a distillation zone wherein substantially pure halogen is separated as a gaseous overhead mixture from a condensed liquid effluent containing halogen and nitrogen oxide halide and the liquid effluent is passed to the oxidation and/or absorption zone. In the oxidation zone, the liquid effluent serves as a cooling medium while its evaporation therein and the resultant hot oxidizer effluent provide the heat necessary to reboil the distillation zone. Generally, in the present process, before entering the distillation zone, the oxidizer effluent is contacted with aqueous sulfuric acid of at least 75% acid concentration for removal of water and easily separated oxides of nitrogen which are converted to nitrosyl sulfuric acid and for additional conversion of hydrogen halide to halogen. In this case, it is preferred to pass at least a portion of the liquid effluent from the distillation zone to the absorption zone to additionally cool the acid undergoing dilution in the absorber. Under most preferred conditions of operation, portions of the liquid effluent are passed to the absorption zone and to the oxidation zone in a volume ratio between about 1:3 and about 3:1, although it is to be understood that all of the liquid effluent can be passed to the oxidizer or the absorber, if desired, but that in the latter case certain advantages of economically maintaining a favorable temperature in the oxidation zone and high conversion to halogen product are difficult to achieve.

In order to retain some benefit of good conversion in the case where all of the liquid effluent is passed to the absorber, it is necessary to provide a lower inlet temperature to the oxidizer, but the lower sulfuric acid temperature resulting from the liquid effluent mixture makes it necessary to add heat for subsequent removal of water from sulfuric acid in a reconcentrator. In cases where at least a portion of the liquid effluent is passed to the oxidizer, it is possible to remove this water by adiabatic flashing.

Another aspect of the present process resides in effecting the oxidation reaction in a plurality of stages wherein a coolant, preferably the liquid effluent, is injected between the stages to cool the reaction mixture to preferred conditions of operation and to maintain an equilibrium temperature range which is most favorable to the formation of halogen.

The liquid effluent which preferably serves as the cooling medium, can be supplemented with a portion of the vaporous overhead mixture removed from the distillation zone after product has been recovered from the vaporous overhead. Other coolants which can be suitably injected into the absorber and/or the reaction mixture in the oxidation zone or between the stages of oxidation include the vaporous overhead, nitrogen oxide or any of the other catalytic materials suitably employed in the process and described hereinafter, oxygen or hydrogen halide or any mixture of these compounds. Indirect heat exchange with the liquid effluent in the absorber and/or reaction zone or zones or another coolant, e.g., water passed through cooling jackets on the lines connecting the various oxidation stages, is also beneficial for the oxidation reaction, although the advantages of utilizing the nitrogen oxide halides (NOCl) and ($NO_2Cl$) in the further production of halogen and supplying reboil to the distillation zone are not obtained. In the case where the liquid effluent is passed in indirect heat exchange with the absorption and/or oxidation zone, the liquid is vaporized by the heat exchange operation or before it is recycled to the lower portion of the distillation zone.

The cooling of the oxidizer or the cooling between stages of the oxidation reaction should not lower the temperature of the reaction mixture to below 450° F. and the temperature in each stage should not be permitted to rise above 800° F. If the latter temperature is exceeded, more oxide of nitrogen compounds appear in the oxidation effluent which leads to subsequent difficulties in the purification of halogen product. When the multi-stage oxidation is employed, it is preferred that at least the first stage of the reaction is back-mixed, for example, by means of a mechanical stirrer, by internal recycle streams, by direction of multi-point injection of feed, or by any other convenient means. Back-mixing of a stage or stages in the oxidation reaction provides not only better contact between the reactants and more uniform distribution of heat but also provides a relatively high ratio of nitrogen dioxide to hydrogen halide, for example, a ratio of at least 0.3:1, preferably between 0.3:1 and about 1.3:1, at any stage of the reaction zone.

Of the inorganic halides reacted in the present process, hydrogen chloride, hydrogen bromide and hydrogen iodide, can be suitably employed, although the chloride is preferred.

The catalytic agents of the present invention are inorganic oxygen-containing compounds of nitrogen wherein the valence of nitrogen is from 2 to 5. Of these, nitrogen monoxide, nitrogen dioxide and nitrosyl halide are preferred; however, compounds which produce nitrogen dioxide in situ, such as nitrogen trioxide, nitrous acid, nitric acid, nitrogen tetroxide, and nitroxyl chloride or any intermixture of these catalyst agents with or without additional mixture with oxygen and air, can also be employed in the process of the present invention. The catalytic agent introduced into the oxidation reactor is employed in catalytic amounts, usually less than a stoichiometric amount with respect to the hydrogen halide. The oxidizing agent of the process, namely, oxygen, can be added as air, ozone or preferably, as molecular oxygen either separately or in admixture with one or more of the other components of the reaction.

The process of the present invention generally includes an oxidation zone where halogen product and water by-product are formed from the reaction between the hydrogen halide and oxygen in the presence of the inorganic oxygen-containing compound of nitrogen, an absorption zone containing sulfuric acid of at least 75% acid concentration wherein additional conversion of the hydrogen halide to halogen takes place and wherein water and easily removable oxides of nitrogen are separated from the oxidation effluent, a distillation zone wherein the remaining impurities such as water, the nitrogen oxide halides including nitroxyl halide (i.e., $NO_2Cl$) and/or nitrosyl halide (i.e., NOCl) are separated from the gaseous halogen product effluent, a stripping zone which receives the contaminated and diluted sulfuric acid-nitrosyl sulfuric acid from the absorption zone and wherein the nitrosyl sulfuric acid is stripped with a stripping gas, such as for example, hydrogen halide, oxygen as molecular oxygen or air, sulfur dioxide, or a mixture of said compounds to regenerate sulfuric acid and an oxygen-containing compound of nitrogen, and a concentrating zone wherein the dilute sulfuric acid is reconcentrated to at least 75% acid concentration, which concentration may be above or below the original concentration of the acid, by the removal of water before recycling to the absorption zone, preferably at an acid concentration above 80%.

In the oxidation zone of the present process wherein the hydrogen halide is contacted with oxygen in the presence of an inorganic oxygen-containing compound of nitrogen, the exothermic reaction to produce halogen product is carried out at a temperature between about 450° F. and about 800° F., preferably between 480° F. and 750° F., under pressure from about 600 mm. Hg to about 15 atmospheres, preferably from 5 to 25 atmospheres.

The reacting mixture in the reaction zone is preferably back-mixed to insure uniform temperature throughout the zone and to provide a uniform distribution of reactants, particularly the catalytic material. Back-mixing is especially desired in the single stage oxidation reactor.

The gaseous effluent from the oxidation zone contains halogen product, water by-product, unconverted hydrogen halide and inorganic oxygen-containing compounds of nitrogen, for example, nitrogen monoxide, nitrogen dioxide, nitroxyl halide and nitrosyl halide. This gaseous effluent is contacted with aqueous sulfuric acid having at least 75% acid concentration which is maintained at a temperature below the temperature of the oxidation zone, generally between about 450° F. and about 100° F., preferably between about 400° F. and about 200° F. Contacting can be accomplished in any known manner, e.g., mechanical mixing, countercurrent contact in a packed tower or with a pool of acid. The sulfuric acid is present in at least a 2:1 weight ratio with respect to the oxidation effluent entering the absorption zone. In the absorption zone between about 5% and about 30% of the conversion of hydrogen halide to halogen takes place, water is removed from the gaseous reaction effluent and nitrogen oxides are converted to liquid nitrosyl sulfuric acid so that an acidic liquid mixture of sulfuric and nitrosyl sulfuric acids is produced. This liquid mixture is regenerated by any convenient method, preferably in the manner hereinafter described. The sulfuric acid treatment of gaseous effluent can be conducted in a plurality of zones, e.g., as described in copending application Ser. No. 426,026, filed Jan. 18, 1965, before the gaseous reactor effluent is passed to the distillation zone.

The halogen, hydrogen halide and nitrogen oxide halide, which are unaffected by the sulfuric acid, are passed together with any remaining water as a gaseous fraction to a distillation zone. In the distillation zone fractional condensation takes place so that a vaporous overhead effluent containing primarily halogen or halogen and hydrogen halide is separated from a liquid mixture containing nitrogen oxide halide, halogen and water. The liquid mixture can be fractionated in the distillation zone to provide a dry liquid effluent and a water-containing liquid effluent. The distillation zone is maintained at a temperature between about −40° F. and about 250° F. under from about 600 mm. Hg to about 80 atmospheres pressure, preferably between about 40° F. and about 170° F. under from 5 to 25 atmospheres pressure. Water, in addition to the amount present in the dried reactor effluent, can be introduced into the lower portion of the distillation zone to absorb any unreacted hydrogen halide when this zone is operated above a temperature of about 50° F.

The vaporous overhead mixture from the distillation zone is cooled to a temperature between about −60° F. and about 200° F. whereupon halogen is condensed. A portion of this condensate is fed to the distillation tower as reflux. A high reflux ratio between about 1.3:1 and about 5:1 volumes of reflux to volume of condensate not refluxed is preferred to prevent nitrogen compounds contaminating the halogen product. The remaining portion of the condensate can be recovered as product containing a small amount of hydrogen halide (less than 0.5%); or it can be further refined, e.g., in a reboiler, to separate vaporous hydrogen halide from liquid product. Uncondensed vapors can be recycled from the condenser to the oxidation zone along with any recovered hydrogen halide. Since these vapors are at a low temperature, they can be conveniently and advantageously employed to cool the reaction mixture in the reaction zone.

It is preferred to operate so that at least the major portion of the liquid effluent from the distillation tower, maintained at a temperature below the temperature of the oxidation reaction or below the oxidation temperature at any particular stage of reaction, can be recycled to the oxidizer as the cooling medium to prevent the temperature from rising above 800° F., preferably to maintain an upper temperature limit of not more than about 750° F. in any one oxidation zone. Any remaining portion of the liquid effluent from the distillation zone can be passed to the absorption zone, if desired. In this way, the liquid effluent from the distillation zone can be used to control the reaction temperature of oxidation within the limits desired for a favorable equilibrium while the heat of the exothermic reaction absorbed by the liquid effluent in the oxidation zone can serve subsequently to supply reboiling to the distillation zone thus providing better heat economy in the process and making possible the elimination of an internal reboiler in the distillation column.

In certain cases, where the hydrogen halide fed to the system contains residual impurities, such as fluorocarbons or other residual organic compounds, a bleed stream can be taken from the distillation zone to eliminate build-up of these impurities in the process.

An important advantage in the present process is realized by pasing the liquid effluent to the oxidizer since it provides an efficient and convenient method of avoiding nitroxyl halide build-up in the refinement stages of the process thus greatly enhancing the economics of the process. Nitroxyl chloride is relatively unaffected by sulfuric acid and does not decompose to any appreciable extent at the distillation temperatures employed in the present process. In other processes, corrosive conditions are encountered where it is desirable to separate concentrated nitroxyl chloride from chlorine, since the temperatures required for reboiling exceeds the temperature at which chlorine can be condensed with cooling water. Its resistance to these methods of removal has led to complicated and expensive after treatment of product for the removal of nitrogen oxide chlorides in chlorine processes where a high chlorine purity is required. The present process not only provides for an economical and convenient method of eliminating nitrogen oxide halide contamination but also utilizes the nitrogen oxide halides in the production of additional quantities of halogen at the higher temperatures which are encountered in the oxidation zone. Thus, a deleterious by-product has been used to advantage in the process of the present invention.

As indicated above, the liquid mixture in the distillation zone can be separated into two effluent streams, e.g., a wet liquid effluent and a dry liquid effluent. The liquid effluent taken from the lower or bottom portion of the distillation zone contains all or almost all of the water in the mixture so that a relatively dry liquid effluent can be separately withdrawn from the lower portion of the distillation zone at a section above the removal of wet liquid effluent. In the case where two or more liquid effluents are separated from the lower portion of the distillation zone, it is preferred to pass the water-containing or wet liquid effluent to the absorption and/or acid regeneration or stripping zone. The dry or drier effluents are preferably passed to the oxidation zone as coolant either by direct or indirect heat exchange.

From the standpoint of economics, it is desirable in the present process to regenerate the spent acid. Accordingly, the sulfuric acid which is contaminated by partial conversion to nitrosyl sulfuric acid, resulting from absorption of oxygen-containing compounds of nitrogen and dilution by absorption of water, is passed to a stripping zone which is maintained at a temperature between about 100° F. and about 400° F. under from about 60 mm. Hg to about 150 atmospheres pressure, preferably from 5 to 25 atmospheres. The acid mixture of dilute sulfuric-nitrosyl sulfuric acid is contacted with hydrogen halide, sulfur dioxide, oxygen or any other mixture of the above gaseous materials to strip out an oxygen-containing compounds of nitrogen from the acid and regenerate the sulfuric acid in the dilute state. The resulting stripping gas mixture can then be passed to the oxidation zone as at least a part of the feed thereto and the resultant dilute sulfuric acid is reconcentrated to at least 75% acid concentration, preferably above 80%, e.g., 85% to 93%, and recycled to the absorber.

The stripping gas or gases can comprise the total amount or a portion of the total amount of the reactants fed to the reactor. It is preferred that at least a substantial portion of the oxygen and hydrogen halide or hydrogen halide be introduced into the stripping zone since in this way the gases can be preheated by contact with the sulfuric acid mixture and the cost of raising the reactant gases to reaction temperature in separate preheater equipment is greatly reduced. It is to be understood, however, that any method of regenerating the spent sulfuric acid, e.g., the method disclosed in the copending patent application Ser. No. 426,026, filed Jan. 18, 1965, can be employed.

Although the present process can be operated with a single stage oxidation or reaction zone, it is preferred that the reaction zone comprise a plurality of stages for oxidation in the vapor phase. Although there is no upper limit on the number of stages which are operable in the process, generally, between about 2 and about 6 stages are conveniently employed. In the case where multi-stage oxidation is effected, it is preferred that at least the first stage is continually back-mixed. The reaction temperature in each stage of a multi-stage operation is allowed to rise to the desired level within the above temperature range, for example, to about 700° F., and the gases are then removed and quenched with liquid effluent from the distillation tower, or with another coolant or by direct or indirect heat exchange, as hereinabove described, to a temperature above 450° F., for example, 480° F.

The degree of quenching between the stages and the exit temperature of the reaction mixture selected for each stage need not be uniform, however, it is preferred that when uniform quenching is not maintained, the quenching temperature is preferably decreased in the direction of reactant flow through the oxidation zone. Quenching of reactor effluent entering the final stage of oxidation to a lower temperature than the quench of the preceding stages and withdrawing the reaction mixture at a lower temperature than in preceding stages permits more complete oxidation of hydrogen halide when the oxidation or reactor effluent is contacted with the sulfuric acid in the absorption zone. Liquid effluent can also be introduced into the first oxidation zone with feed to control temperatures, if desired.

For a better understanding of the present process, reference is now had to the accompanying drawing which illustrates a specific and preferred embodiment of the present process, but is not to be construed in any way limiting to the scope of this invention.

Into stripping zone 4 is passed a liquid mixture hereinafter described containing about 256,000 pounds per hour of 80% aqueous sulfuric acid and 38,000 pounds per hour of nitrosyl sulfuric acid at a temperature of 390° F. under 15 atmospheres pressure. This liquid mixture is contacted with about 4,800 pounds per hours of oxygen from line 5, about 92 pounds per hour of nitrogen dioxide from line 6, and about 22,000 pounds per hour of hydrogen chloride from line 7. The hydrogen chloride converts the nitrosyl sulfuric acid to liquid sulfuric acid and nitrosyl chloride. From the lower portion of the stripper, oxygen is bubbled upwardly through the liquid to strip entrained hydrogen chloride from the dilute liquid sulfuric acid. The gaseous mixture, containing in addition to the generated gases, oxygen, unreacted hydrogen chloride and nitrogen dioxide, added to supplement the catalyst, is passed by means of line 8 into the first stage of a three-stage oxidation reactor. The gaseous materials are reacted in back-mixed oxidation zone 1 at a temperature of 750° F. wherein about 66% of the hydrogen chloride conversion to chlorine is achieved. The gaseous reactor effluent containing hydrogen chloride, oxygen and catalyst initially introduced into zone 2 and chlorine, water and nitroxyl chloride, is then withdrawn from zone 1 by means of line 9 and is quenched to a temperature of 500° F. with about 110,000 pounds per hour of a liquid effluent mixture containing chlorine, water and nitrogen oxide chlorides from line 10, as hereinafter described. The quenched effluent is then introduced into oxidation zone 2 where an additional 14% hydrogen chloride conversion takes place in the vapor phase while the temperature is allowed to rise to 600° F. At 600° F. the reaction mixture is withdrawn by means of line 11, and is quenched to 450° F. with about 80,000 pounds per hour of the liquid effluent containing chlorine, water and nitrogen oxide chlorides from line 12. The resulting quenched mixture is then passed to oxidation zone 3 wherein another 5% hydrogen chloride conversion takes place and the gaseous effluent is withdrawn at a temperature of 580° F.

This gaseous oxidation effluent under about 15 atmospheres pressure is then passed by means of line 13 into absorber 14 wherein the gaseous effluent is countercurrently contacted with aqueous sulfuric acid having 83% acid concentration in a packed column at a temperature of 310° F. to 380° F. An additional 14% conversion of hydrogen chloride takes place. Water is removed from the oxidizer effluent to reduce the sulfuric acid concentration to 81% and the oxides of nitrogen contained in the oxidizer effluent are reacted with the sulfuric acid to provide about 294,000 pounds per hour of a liquid mixture of about 38,000 pounds of nitrosyl sulfuric acid and about 256,000 pounds of diluted sulfuric acid. It is to be understood that the treatment with concentrated sulfuric acid can be carried out in a plurality of zones, if desired. In this case, conversion to chlorine and removal of water of reaction is obtained in the initial absorption zone which is cooled by the liquid effluent from the distillation zone. Subsequent stage or stages of absorption are employed primarily to remove oxides of nitrogen from the reaction effluent, although any water remaining in the treated effluent is also removed.

The remaining contaminants, including nitroxyl chloride, hydrogen chloride and nitrosyl chloride, together with chlorine product which are not affected by the sulfuric acid are removed as a vaporous fraction from the upper portion of the absorber and passed by means of line 15 to distillation zone 16 wherein at a bottoms temperature of between about 125° F. and about 135° F. and at a top temperature between about 110° F. and about 125° F. under from about 13 to about 15 atmospheres pressure, about 108,000 pounds per hour of chlorine in admixture with about 500 pounds per hour of hydrogen chloride are separated and removed as a gaseous overhead mixture by means of line 17 from about 65,000 pounds per hour of a condensed liquid mixture comprising about 64,000 pounds of chlorine, about 350 pounds of nitroxyl chloride, about 200 pounds of water and about 300 pounds of nitrosyl chloride. The liquid effluent is withdrawn from distillation zone 16 by means of line 18 and about 37,000 pounds per hour are introduced into zone 14 by means of valved line 19. Of the remaining portion, about 13,000 pounds per hour are passed into valved line 10 and about 15,000 pounds per hour are passed into valved line 12 as coolant feed to subsequent stages of the oxidation zone as described above.

By means of the large recirculation of chlorine in the liquid effluent, the heat of the process is removed efficiently and economically and the recovery of chlorine product, free of oxygen- and nitrogen-containing contaminants in the vaporous overhead from the distillation zone, is accomplished.

The vaporous overhead mixture containing chlorine product and hydrogen chloride and inerts, such as nitrogen, oxygen, etc., is cooled to 95° F. in water cooler 20 and passed to separator 29 wherein the condensate is separated from vapors containing inerts, uncondensed chlorine and hydrogen halide. The vapors are removed by line 31 and a portion is fed to oxidation zone 1 from line 40. The remaining portion of vapors are cooled by a refrigerant in cooler 23 to separate chlorine and hydrogen chloride from uncondensed inerts in separator 24. Inerts are bled from the system by line 41 while recovered hydrogen chloride and chlorine liquid is passed to condensate in line 22 via line 42.

A portion of the first condensate, about 61,000 pounds per hour, is used to reflux the upper portion of the distillation tower by means of line 21. The large chlorine reflux is advantageously employed to prevent the presence of corrosive nitrogen oxide chlorides and water in the top of the distillation tower. The remaining portion of the first condensate, about 23,000 pounds per hour, is passed with refrigerated condensate from line 42 to reboiler 25 via line 22. In reboiler 25 at a temperature of about 120° F. under 14 atmospheres pressure, about 21,000 pounds per hour of liquid chlorine product is recovered by means of line 26 from hydrogen chloride vapors withdrawn from reboiler 25 by means of valved line 27. A portion of the uncondensed vapors in line 31 together with vaporous hydrogen chloride in line 27 can be recycled directly to the oxidation zone as, for example, by means of dotted line 28 or the vapors can be passed to zone 4 in order to heat the vapors to reaction temperature before entry into the oxidizer.

The process of the present invention is adapted to the auto-regeneration of absorbent and catalyst by the following procedure. Although it is to be understood that other methods of reconcentrating and regenerating sulfuric acid and an oxygen-containing compound of nitrogen can be employed. In this example, about 294,000 pounds per hour of the liquid mixture of sulfuric-nitrosyl sulfuric acid is withdrawn from absorber 14 by means of line 30 and passed to stripper 4 wherein the diluted sulfuric acid is regenerated as described hereinabove and the regenerated dilute sulfuric acid is withdrawn from the lower portion of stripper 4 and passed by means of line 31 to concentrator 32 which can be any acid concentrating equipment resistant to corrosion, e.g., tantalum, brick or glass-lined equipment. In the present embodiment, concentrator 32 is a flashing zone operated under vacuum at a temperature of between about 290° F. and about 325° F. Under these conditions, water vapor is withdrawn in line 34 until the concentration of the acid reaches about 83.5%. The 83.5% acid is removed by means of line 36 from the lower portion of concentrator 32 and pumped by means of pump 37 to absorber 14 by way of line 13, e.g., in contact with the oxidation effluent. Make-up sulfuric acid can be introduced to the process by means of valved line 38 as needed. Alternatively, make-up acid can be introduced into the stripper, the concentrator and/or the recycle stream from the concentration zone.

Many variations and modifications of the above embodiment will become apparent to those skilled in the art from the various aspects and combinations indicated by this disclosure. For example, hydrogen bromide can be substituted for hydrogen chloride, in the above example in which case bromine is the product of the reaction and nitrosyl bromide and nitroxyl bromide are produced as intermediate by-products. It is also understood that oxidation zones 1, 2 and 3 can be replaced by a single stage oxidizer, in which case quench lines 10 and 12 are combined for coolant feed to the oxidation zone. Also, one or more of the reactants and/or catalyst can be fed by multi-point injection into the single stage reaction zone or stages of a multi-stage reaction zone. Any of the other catalysts mentioned herein, e.g., nitrosyl chloride, can be employed as make-up catalyst and substituted for $NO_2$ introduced into stripper 4 by means of line 6. The concentration of sulfuric acid in zone 32 can be carried out in a distillation or fractionating column, if desired, to obtain a level of acid concentration up to about 90%. It is also to be understood that nitrogen dioxide, a portion of the hydrogen chloride, and/or a portion of the oxygen can be intermittently or continuously fed to the various stages of the oxidation zone without prior introduction into stripper 4. Also, in the above example, the liquid effluent passing to absorber 14 from distillation zone 16 can be eliminated, if desired. The process may also be operated at different pressures defined by the ranges as set forth herein. For example, oxidation can be effected at a high pressure, above 80 atmospheres, and the pressure reduced to 80 atmospheres or less before distillation, if desired. Liquid hydrogen halide, for example, hydrogen chloride, or liquid oxygen can be employed as a refrigerant in cooler 23 to cool the vapors by direct or indirect heat exchange. Any other convenient refrigerant such as, for example, Freon, may be employed as refrigerants in indirect heat exchange with the vaporous material. Many other modifications will become apparent to those skilled in the art from the above description and disclosure.

Having thus described our invention, we claim:

1. In a process comprising the steps in combination which include oxidizing hydrogen halide with oxygen in the presence of an inorganic oxide of nitrogen catalyst in the vapor phase in an oxidation zone at a temperature between about 450° F. and about 800° F. so as to produce an oxidizer effluent containing halogen, water, oxides of nitrogen and nitrogen oxide halides including nitrosyl halide and nitroxyl halide, said nitroxyl halide being unaffected by treatment with sulfuric acid and being substantially undecomposable under the conditions of subsequent product separation; passing said oxidizer effluent from said oxidation zone to an absorption zone wherein water and oxides of nitrogen are absorbed in sulfuric acid of at least 75 percent acid concentration to form an acidic sulfuric-nitrosyl sulfuric acid mixture in the liquid phase and a mixture of halogen, nitrosyl halide, nitroxyl halide and water in the gaseous phase, the improvement which comprises:

(a) passing said gaseous mixture from the absorption zone to a rectification zone wherein halogen is recovered as a gaseous fraction and nitrosyl halide, nitroxyl halide and a minor portion halide and a minor portion of the halogen are condensed at a temperature between about −40° F. and about 250° F.; and (b) passing a sufficient amount of the liquid condensate halogen, nitrosyl halide and nitroxyl halide mixture as a quenching medium to said oxidation zone to maintain a reaction temperature therein not more than 800° F. and to convert the nitroven oxide halides to halogen so as to prevent build-up of nitroxyl halide in the process.

2. The process of claim 1 wherein a portion of the liquid condensate mixture is passed to the absorption zone to control the temperature therein between about 100° F. and about 400° F.

3. The process of claim 1 wherein the oxidation zone is back-mixed.

4. The process of claim 1 wherein the liquid effluent coolant is passed to the absorption zone and the reaction zone in a volume ratio of between about 3:1 and about 1:3.

5. In the exothermic oxidation of a hydrogen halide with oxygen in the presence of an inorganic oxygen-containing compound of nitrogen wherein halogen and water are produced as a gaseous effluent and halogen is recovered from the gaseous reactor effluent, the improvement which comprises:

(a) conducting the exothermic reaction in a multi-stage reaction zone;

(b) controlling the temperature in each stage so that it does not exceed 800° F. before the reaction mixture is cooled; and (c) quenching the reaction mixture withdrawn from each stage to reduce the temperature of the mixture by at least 50° before it is passed to the next succeeding stage.

6. The process of claim 5 wherein at least the first stage of the oxidation reaction is back-mixed to provide uniform temperature and composition in the back-mixed zone.

7. The process of claim 5 wherein the mole ratio of nitrogen dioxide to hydrogen chloride is maintained between 0.3:1 and 1.3:1 in each of the stages of oxidation.

8. The process of claim 7 wherein nitrogen dioxide is injected into the reaction mixture at least at the point prior to entry into the first stage of the oxidation reactor.

9. The process of claim 6 wherein the reaction temperature in each stage which is not back-mixed varies within a range of between about 480° F. and about 750° F.

10. The process of claim 5 wherein the reaction mixture from each stage of the multi-stage oxidation is quenched to progressively lower temperatures until the reaction mixture from the final oxidation stage is withdrawn.

11. The process of claim 5 wherein the exit temperature of the reaction mixture in each successive stage of the multi-stage oxidation is at a progressively lower temperature.

12. The process of claim 5 wherein a stage of the multi-stage oxidation is quenched by direct heat exchange with a liquid coolant mixture containing halogen and nitrogen oxide halide.

13. In the oxidation of hydrogen halide with oxygen in the presence of an inorganic oxygen-containing compound of nitrogen the steps in combination which comprise:

(a) contacting the hydrogen halide, oxygen and an inorganic oxygen-containing compound of nitrogen in an oxidation zone at a temperature between about 450° F. and about 800° F. under 600 mm. Hg to about 150 atmospheres to produce a gaseous effluent containing halogen, water, oxides of nitrogen, nitrogen oxide halides and unreacted hydrogen halide;

(b) passing the gaseous effluent to an absorption zone wherein the vapors are contacted with aqueous sulfuric acid of at least 75% acid concentration to remove water and oxides of nitrogen from the reactor effluent and to convert the oxides of nitrogen to nitrosyl sulfuric acid in the liquid phase;

(c) withdrawing the dried gaseous effluent from the absorption zone and passing the gaseous effluent to a distillation zone wherein at a temperature between $-40°$ F. and about 250° F. under from about 600 mm. Hg to about 80 atmospheres pressure, remaining water, nitrogen oxide halides and a portion of the halogen is condensed and comprises a liquid mixture in the distillation zone;

(d) passing at least a portion of the liquid mixture as a liquid effluent to the oxidation and/or oxidation and absorption zones to cool said zones;

(e) withdrawing a vaporous overhead mixture containing halogen and hydrogen halide from the distillation zone;

(f) condensing halogen from the overhead mixture and passing a portion of the condensate to the distillation zone as reflux thereto while recovering the remaining portion of condensate as liquid halogen product; and (g) passing vaporous hydrogen halide from the distillation zone to the oxidation zone after removal of inert gases.

14. The process of claim 13 wherein the liquid mixture of diluted sulfuric acid-nitrosyl sulfuric acid is withdrawn from the absorption zone and passed to a stripping zone wherein the mixture is stripped with hydrogen halide to regenerate liquid sulfuric acid and inorganic oxygen-containing compound of nitrogen in a gaseous fraction, the gaseous fraction is passed to the oxidation zone and the regenerated liquid mixture is reconcentrated to a sulfuric acid concentration of at least 75% acid and recycled to the absorption zone.

15. The process of claim 14 wherein oxygen in the form of molecular oxygen or air is introduced into the lower portion of the stripping zone to remove any entrained hydrogen chloride gas from the liquid mixture and the oxygen and unreacted hydrogen halide are combined with the gas in the gaseous fraction from the stripping zone which is introduced into the oxidation zone.

16. The process of claim 13 wherein the oxidation zone is a multi-stage zone wherein the concentration of $NO_2$ to HCl at any point during oxidation is maintained between about 0.3:1 and about 1.3:1.

17. The process of claim 13 wherein the vaporous overhead mixture contains inert gases, halogen is condensed from the overhead vaporous mixture in a water-cooled cooling zone and is separated from an uncondensed vapor fraction containing halogen, hydrogen halide and inerts, a major portion of the vapor fraction is passed to the oxidation zone, the remaining portion of the vapor fraction is refrigerated to condense halogen and hydrogen halide from the remaining uncondensed vaporous inerts which are bled from the system, and passing the refrigerated condensate together with the non-refluxed, water-cooled condensate to a reboiler to separate vaporous hydrogen halide from liquid halogen product.

18. The process of claim 17 wherein the vaporous hydrogen halide from the reboiler is passed to the oxidation zone.

19. The process of claim 15 in which the stripping zone is operated under a pressure of between about 5 and about 25 atmospheres.

20. The process of claim 13 in which the oxidation zone is back-mixed.

References Cited

UNITED STATES PATENTS

| 3,049,417 | 8/1962 | Bradley et al. | 23—219 |
| 3,152,870 | 10/1964 | Baumgartner et al. | 23—219 |
| 3,449,079 | 6/1969 | Jongenburger et al. | 23—219 |
| 3,451,776 | 6/1969 | VanDijk et al. | 23—219 |

OTHER REFERENCES

Beckham, L.: "Chemical Reviews"; vol. 48; February–June 1957, pages 321–22.

OSCAR R. VERTIZ, Primary Examiner

G. O. PETERS, Assistant Examiner